US007010638B2

(12) United States Patent
Deng et al.

(10) Patent No.: US 7,010,638 B2
(45) Date of Patent: Mar. 7, 2006

(54) HIGH SPEED BRIDGE CONTROLLER ADAPTABLE TO NON-STANDARD DEVICE CONFIGURATION

(75) Inventors: Brian Tse Deng, Richardson, TX (US); Dinghui Richard Nie, Plano, TX (US); Joseph M. Erickson, Frisco, TX (US)

(73) Assignee: Texas Intruments Incorporated, Dallas, TX (US)

( * ) Notice: Subject to any disclaimer, the term of this patent is extended or adjusted under 35 U.S.C. 154(b) by 242 days.

(21) Appl. No.: 10/651,524

(22) Filed: Aug. 29, 2003

(65) Prior Publication Data

US 2005/0060479 A1 Mar. 17, 2005

(51) Int. Cl.
*G06F 13/00* (2006.01)
*G06F 13/36* (2006.01)

(52) U.S. Cl. ........................ 710/306; 710/52; 710/315

(58) Field of Classification Search ................ 710/306, 710/315, 100, 313, 52, 305, 5, 33, 57, 260, 710/63, 72; 712/32; 709/253; 711/111–112
See application file for complete search history.

(56) References Cited

U.S. PATENT DOCUMENTS

| | | | | |
|---|---|---|---|---|
| 5,701,450 | A * | 12/1997 | Duncan | 712/245 |
| 6,477,609 | B1 * | 11/2002 | Reiss et al. | 710/306 |
| 6,571,308 | B1 * | 5/2003 | Reiss et al. | 710/315 |
| 6,658,508 | B1 * | 12/2003 | Reiss et al. | 710/100 |

OTHER PUBLICATIONS

"Active objects: a paradigm for communications and event driven systems" by Caal et al. (abstract only) Pubilcation Date: Nov. 28-Dec. 2, 1994.*

* cited by examiner

*Primary Examiner*—Gopal C. Ray
(74) *Attorney, Agent, or Firm*—William B. Kempler; W. James Brady, III; Frederick J. Telecky, Jr.

(57) ABSTRACT

A bridge controller controls the data flow to/from a USB bus to/from an ATA/ATAPI drive, such as an ATA hard drive or ATAPI CD or DVD drive. The bridge controller has a state machine which receives the CBW in a background mode in real time as the packet is being transferred to the bridge controller. The state machine uses the CBW to set up the data transfer. The bridge controller also has a programmable processor which is coupled to the CBW once it is received in a buffer memory. The programmable processor makes changes in the set up of the receiving device for the transfer, if needed, and initiates the data transfer.

20 Claims, 8 Drawing Sheets

HIGH SPEED BRIDGE CONTROLLER ADAPTABLE TO NON-STANDARD DEVICE CONFIGURATION

FIELD OF THE INVENTION

This application relates to a bridge controller and more specifically to a bridge controller for a USB 2.0 ATA/ATAPI storage device.

BACKGROUND OF THE INVENTION

The Universal Serial Bus (USB) 2.0 standard supports data transmission rates of 1.5, 12 and 480 megabits per second. The data can be transmitted over cables up to 5 m in length and up to 127 devices can be supported. A USB 2.0 host controller is required to control the bus and the data transfer. FIG. 1 shows the circuit connection of a USB mass storage bridge controller in a computer system. A computer 102 has a USB host controller inside of the computer. The host controller controls the transmission along the USB bus 104 to the USB mass storage bridge controller 106. The USB mass storage bridge controller 106 is connected via an ATA/ATAPI bus 108 to an ATA/ATAPI mass storage drive 110. This can be, for example, an ATA hard drive or an ATAPI CD or DVD drive. The USB host controller sends a command block wrapper (CBW) data packet along the USB bus as shown in block 112. This signal is used by the USB mass storage bridge controller 106 to program the drive 110 to receive or send data. As shown block 112, data transfer then takes place between the computer and the mass storage drive or between the mass storage drive and the computer. Once the data transmission has been completed, a Command Status Wrapper (CSW) data packet showing the status of the drive and of the data transmission is sent back to the computer. USB 2.0 supports two types of transfers for large blocks of data: a bulk transfer for moving data that cannot tolerate errors and an isochronous transfer for moving data that cannot tolerate delay. The transport command set used in the bulk-only protocol is based upon the SCSI transparent command set, which is wrapped with certain information related to the bulk-only protocol, to form a command block wrapper (CBW) for a specific transport.

The CBW contains 31 bytes of data which must be processed. Certain bytes are checked for authenticity whereas others are utilized to program the device from/to which the data transfer will occur. Table 1 shows of an arrangement of a Command Block Wrapper (CBW). The first field contains 4 bytes of data corresponding to the dCBWSignature which identifies the data packet as a CBW. The next field is the command block tag which is sent by the host. The contents of this field are echoed back to the host when the drive returns the status packet (CSW). The third field containing bytes 8–11 is the data transfer length and contains the number of bytes of data that the host expects to transfer on the bulk-in or bulk-out transfer during the execution of the command. If this field is zero, the drive and the host transfer no data and the device will ignore the value of the direction bit. The next field comprises byte 12 which contains the CBW flags which controls the direction of data transfer. The next field contains a single byte which has the first 4 bits reserved and a second 4 bits containing the logical unit number of the device to/from which data is transferred. The next field contains 3 bits which are reserved and five bits used for the command block length. The final field contains bytes 15–30 which contains the command block which is the command to be executed by the drive.

Typically the processing of the CBW has been accomplished by using a hardware state machine or by using a software controlled microcontroller (MCU). The hardware state machine is much faster than a software controlled microcontroller and can typically perform this task in a few microseconds. The disadvantage of a hardware state machine based device is that it is not adaptable to ATA/ATAPI devices which may not correctly follow the standard. Manufacturers may choose to use reserved registers to provide additional features in their device. This is a common situation. This means that an existing hardware state machine based controller cannot be used with non-compliant devices because it cannot handle the nonstandard situation. Once the hardware controller is manufactured in silicon, it is not possible to change the operation of the state machine. A software controlled microcontroller, however, can readily be changed because the software program is normally stored in an electrically reprogrammable non-volatile memory, such as flash memory or EEPROM, to provide the needed flexibility to handle a later produced non-standard device. A software solution, however, is much slower than the hardware solution and typically takes 500–700 microseconds to perform the task.

Table 1

Command Block Wrapper

| Byte | bit 7 | 6 | 5 | 4 | 3 | 2 | 1 | 0 |
|---|---|---|---|---|---|---|---|---|
| 0–3 | dCBWSignature | | | | | | | |
| 4–7 | dCBWTag | | | | | | | |
| 8–11 (08h-0Bh) | dCBWData TransferLength | | | | | | | |
| 12 (0Ch) | bmCBWFlags | | | | | | | |
| 13 (0Dh) | Reserved (0) | | | | bCBWLUN | | | |
| 14 (0Eh) | Reserved (0) | | | bCBWCBLength | | | | |
| 15–30 (0Fh-1Eh) | CBWCB | | | | | | | |

The USB 2.0 bus is a convenient way to add additional storage capacity to a computer, especially a laptop computer, and USB 2.0 connected hard drives are readily available. Tests utilizing standard benchmark software for such devices show that they are slower than internal hard drives. The 500–700 microseconds time required by the software based controller to set up the data transfer is the same regardless of the size of the file transferred. Thus, it appears that this time seriously impacts the performance of USB 2.0 connected hard drives. Therefore, there's a need for a USB 2.0 controller that has the speed of a hardware state machine and the flexibility of a software controlled microcontroller and in addition can perform the operation at a higher speed than currently available devices.

SUMMARY OF THE INVENTION

It is a general object of the present invention to provide a high speed, high flexibility bridge controller.

This and other objects and features of the invention are provided, in accordance with one aspect of the invention, by a bridge controller for transferring data between a data storage device and a data utilization device, the bridge controller receiving a command information packet for controlling the data transfer. A state machine receives command information in a background mode in real time as the packet is being transferred to the bridge controller, the state machine utilizing the command information to set up the receiving device for the data transfer. A programmable processor is coupled to the command information packet after the packet has been received, the processor making changes to the set up of the receiving device for the transfer, if needed, and then initiating the data transfer.

Another aspect of the invention includes a USB to ATA/ATAPI bridge. A physical layer receives serial command data from the USB bus and converts the data to a parallel format. A transfer controller receives the parallel data and transfers the data to a buffer memory. A state machine operating in background mode on the parallel data flowing through the transfer controller in real time sets up the ATA or ATAPI device for a data transfer. A programmable processor is coupled to the buffer memory and being interrupted after all command information has been received, to individually alter any set up data for the ATA or ATAPI device that is needed, and then initiates the data transfer.

A third aspect of the invention comprises a method of operating a USB to ATA or ATAPI bridge. Command data is transferred from a data utilization device via a USB bus through a data transfer device to a buffer memory. A state machine is operated in a background mode using data flowing through the data transfer device in real time to extract set up data and store the data in the required command-related registers to set up a data transfer. A programmable processor utilizes the data stored in the buffer memory to individually alter the command-related data for the ATA or ATAPI device that is needed. The data transfer is then initiated.

DETAILED DESCRIPTION OF THE PRESENT INVENTION

Figure 1:
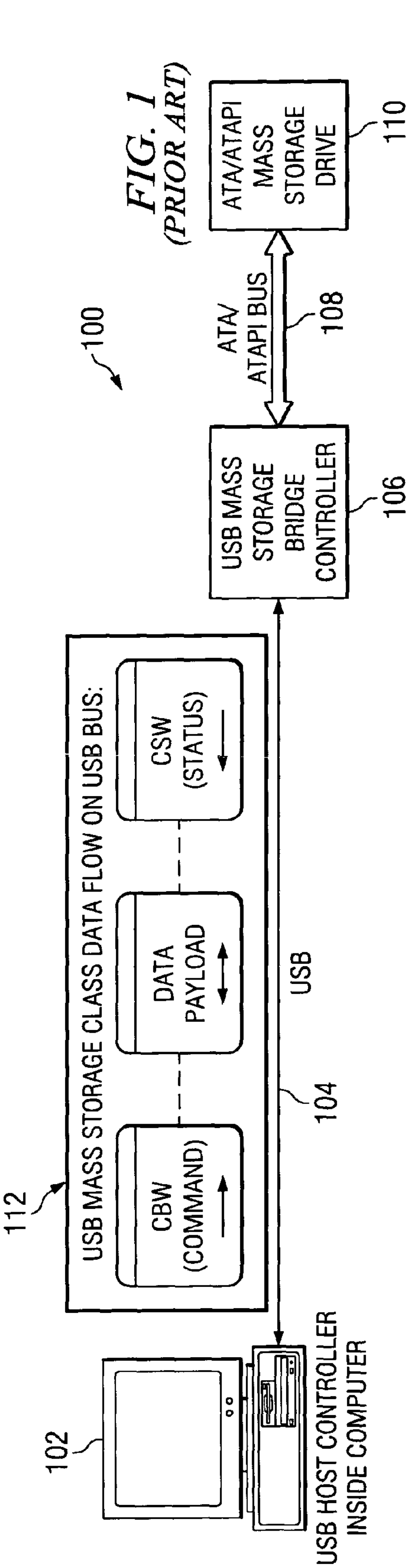
FIG. 1 is a block diagram of a USB connected mass storage drive showing data flow on the USB bus.
Figure 2:
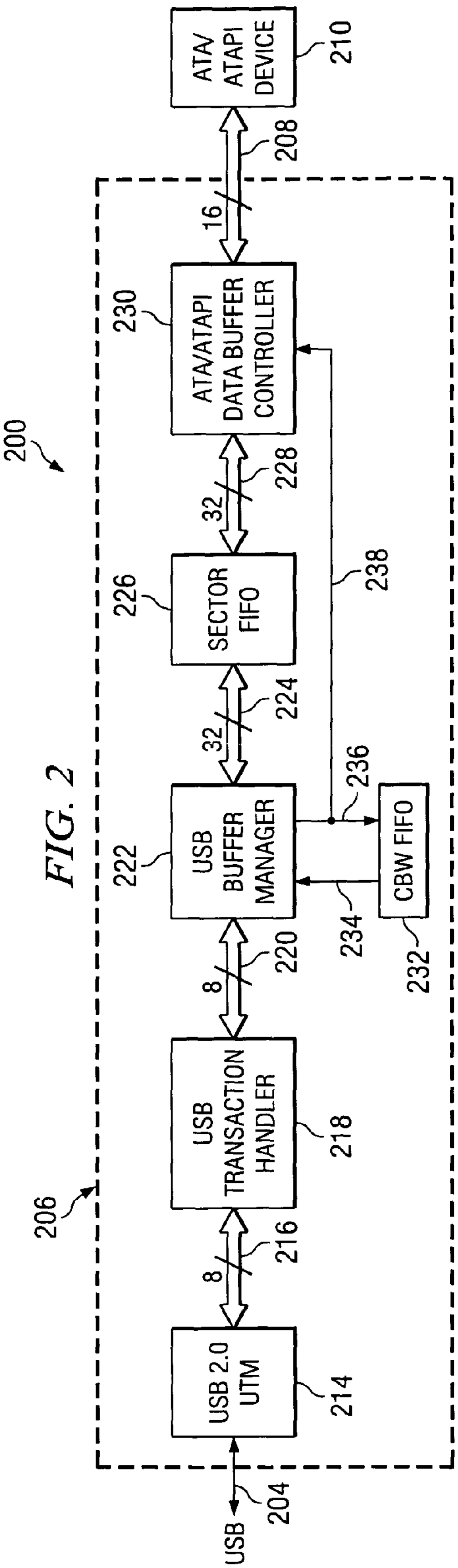
FIG. 2 is a block diagram of a USB mass storage bridge controller according to the present invention.

FIG. 2 is a block diagram illustrating the data flow in a USB 2.0. ATA/ATAPI bridge shown generally as 200. The USB bus 104 of FIG. 1 is illustrated as 204 and the ATA/ATAPI bus 108 is illustrated as 208. The serial data on the USB bus 204 enters the USB 2.0 UTM 214. The UTM is a UTMI compliant PHY which receives the serial data either in high speed or full speed mode from the external upstream USB host controller, such as the controller found in host computer 102. The PHY in block 214 processes the serial data stream and converts it to an 8 bit wide parallel data bus signal based upon protocol found in the USB 2.0 specification and the UTMI specification. The 8 bit wide data is passed via bus 216 to the USB transaction handler 218 which processes the data utilizing the USB packet protocol and passes the data on to the USB buffer manager 222 via bus 220. For CBW packets, the USB buffer manager performs the address decoding and passes a data packet to the addressed buffer location in the CBW FIFO 232. The USB buffer manager also generates the appropriate interrupt to inform the microcontroller of the arrival of the new data packet. The CBW FIFO 232 is coupled to the USB buffer manager 222 via bus 234 and to the ATA/ATAPI data buffer controller 230 via bus 238. Buses 234 and 238 are 32 bits wide and transmit the so-called “quadlet”.

The ATA/ATAPI data buffer controller 230 has both a hardware state machine and a microcontroller to provide both the speed and the flexibility in control needed for a buffer controller. Block 230 is described in greater detail in connection with FIGS. 3–7 below. The data buffer controller 230 transmits data over a 16 bit wide bus 208 to the targeted ATA/ATAPI drive where the data is utilized to set registers in the device 210 in order to program the data transfer which will occur. Once data transfer has occurred, the target device 210 will notify the bridge controller, which in turn will send back a CSW status to the host computer 102.

Figure 3A:
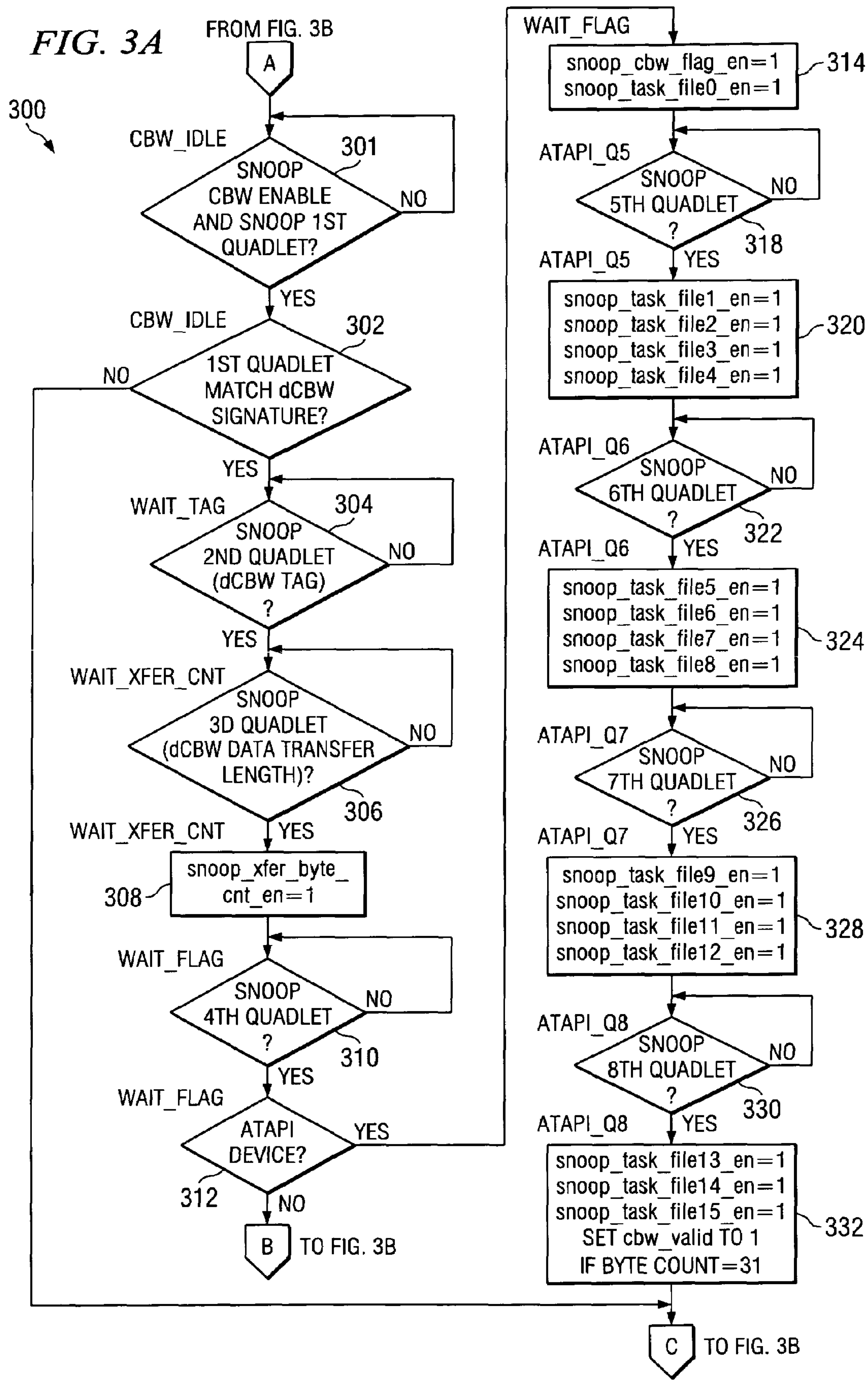
FIGS. 3A and 3B are state diagrams of the state machine used to detect a Command Block Wrapper (CBW)
Figure 3B:
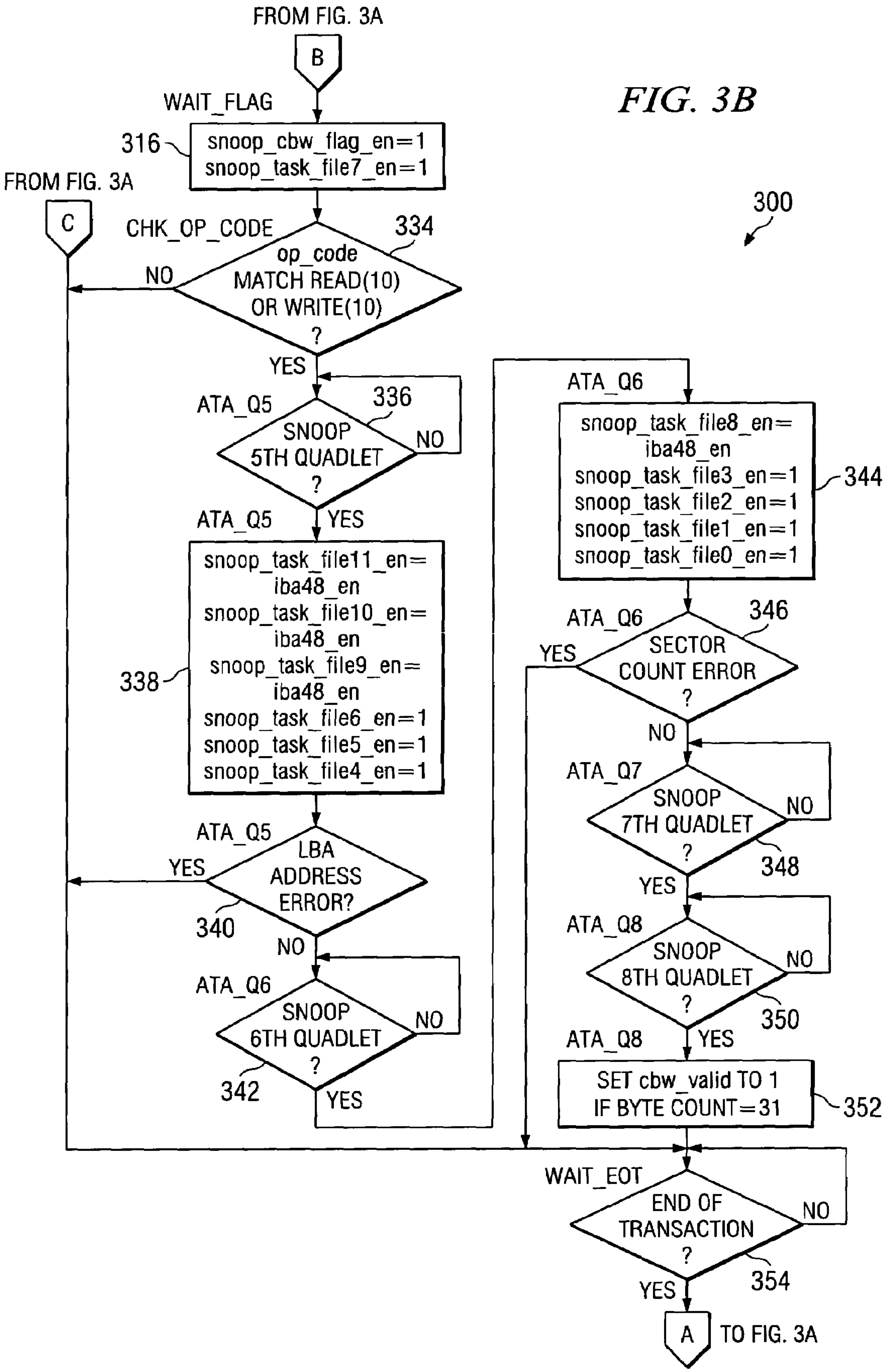

FIG. 3 is a state diagram of a state machine used to detect Command Block Wrapper (CBW) packet information and extract the parameters needed for the ATA/ATAPI controller or to issue the requested command to the ATA/ATAPI device. The state machine receives the data while the CBW FIFO 232 is being filled with the data, that is, while the data is being transferred to the buffer. This greatly increases the speed at which the processing of the command data can be done. In the drawings that follow, this “on-the-fly” processing of the data is referred to as “snoop” commands. In the drawings the states of the state machine are labeled by text to the left of the decision blocks and the decision blocks themselves are numbered. Some of the states contain more than one decision block.

The first state in the state machine is the idle state labeled “CBW_IDLE”. This state is an idle state waiting for the output data packet address to this node and the acquisition of data in real time as it is being transferred to the bridge controller takes place. If this data acquisition mode is enabled by the signal, labeled the “snoop” CBW enable in block 301, the state machine receives the first data packet and looks at the first data quadlet in block 302 to see if it matches the dCBWSignature. In this example, the signature would be “0x43425355” which is the ASCII code “CBSU” which means a USB mass storage class command. If this first data quadlet matches the signature, the machine goes to the state “WAIT_TAG”. If the data does not match the signature, the state machine will ignore this bit packet and go to the state “WAIT_EOT” to wait for end of the transaction at block 354.

If the first quadlet matches the signature, the machine passes to state 304 which waits for the second data quadlet of the CBW. The second data quadlet contains the dCSWTag which is the command block tag. This is the code that the targeted drive will echo back to the host in the dCSWTag field of the associated CSW. The state machine ignores this tag, which is not related to the ATA/ATAPI command parameters and control passes to block 306. The controller stores all of the USB data for the targeted drive so that it can be utilized to send the dCBWTag to the host during the status stage.

Block 306 is the WAIT_XFER_CNT state for the machine. In this state, the machine waits for the receipt of the third data quadlet, which contains the dCBWDataTransferLength which is the transfer byte count. When this signal is received, the signal “snoop_xfer_byte_cnt_en” is set to a “1”, so that the ATA/ATAPI controller can load the the third quadlet data presented on the data bus usb_rcv_data (31:0) into the snoop_xfer_byte_cnt (31:0), see FIG. 4, which will be used as the ATA/ATAPI transfer byte count. This loads bytes 8–11 of the CBW, see Table 1. After the third data quadlet has been received, the machine goes to the WAIT_FLAG state at block 310.

The WAIT_FLAG state 310 waits for the receipt of the fourth quadlet. When the fourth quadlet is received, control passes to block 312 which checks whether the device is an ATAPI device and if so passes control to block 314. The determination of whether the target device is an ATA or ATAPI device is set by the firmware at the initialization of the system. In block 314, snoop_cbw_flag_en is set equal to 1 and snoop_task_file0_en is set equal to 1. Flip flop 444 receives a signal usb_rcv_data(7:0) on its data input, see FIG. 4 described below, and the signal snoop_cbw_flag_en is applied on the active low enable input ENZ. This results in the signal snoop_cbw_flag(7:0) being output at the Q output of the flip flop. Bit 7 contains the direction of the bmCBW flags of the CBW, which is used to set up the ATA/ATAPI data transfer direction. The usb_rcv_data(31:24) on the fourth quadlet contains the CBWCB byte 0 which will be loaded into the task_file0, see FIG. 5, which will be written into the first byte of a command packet to the ATAPI device. Control then passes to block 318 which is the state ATAPI_Q5.

If at the WAIT_FLAG state in decision block 312 the device is not determined to be an ATAPI device but an ATA device, control then passes to block 316 in which snoop_cbw_flag_en is set equal to 1 and snoop_task_file7_en is set equal to 1.

The information contained in usb_rcv_data(7) of the fourth data quadlet contains the direction of the bmCBW flags of the CBW, which is used to set up the ATA/ATAPI data transfer direction. The data stored in usb_rcv_data(31:24) of the fourth quadlet contains the opcode of the CBW. The operation code of the ATA devices needs to be translated into commands that such devices will understand. This is only true of ATA devices. The commands Read (10), which has an opcode equal to 28h, and Write (10), which has an opcode equal to 2Ah, are translated into ATA Read DMA, having an opcode of C8h, and Write DMA, having a command of CAh, for 28-bit LBA address, respectively; or into ATA Read DMA Ext, equal to 25h, and Write DMA Ext, equal to 35h, for a 48-bit LBA address. The coded and translated opcode is loaded into task_file_7, which will write this data (information) to the ATA device command register. After receipt of the fourth data quadlet, the machine goes to the state CHK_OP_CODE.

The ATAPI_Q5 state checks for the receipt of the fifth quadlet at block 318. Once the quadlet is received, control passes to block 320 in which the signals snoop_task_file1_en, snoop_task_file2_en, snoop_task_file3_en, and snoop_task_file4_en are all set equal to 1. The use of these signals is explained below in connection with FIG. 5. The data contained in usb_rcv_data (31:24) of the fifth quadlet will load into task_file4, the data contained in usb_rcv_data(23:16) of the fifth quadlet will load into task_file3, the data in usb_rcv_data(15:8) of the fifth quadlet will load into task_file2, and the data in usb_rcv_data(7:0) of the fifth quadlet will load into task_file1. After receipt of the fifth data quadlet, control passes to the ATAPI_Q6 state.

State ATAPI_Q6 awaits the receipt of the sixth data quadlet at block 322. Once the quadlet is received control passes to block 324 in which the signals snoop_task_file5_en, snoop_task_file6_en, snoop_task_file7_en, and snoop_ask_file8_en are all set equal to 1. The data in usb_rcv_data(31:24) of the sixth quadlet will loaded into task_file8, the data in usb_rcv_data (23:16) of the sixth quadlet will load into task_file7, the data located in usb_rcv_data(15:8) of the sixth quadlet will load into task_file6 and the data located in usb_rcv_dat(7:0) of the sixth quadlet will load into task_file5. After the sixth data quadlet is received, the machine enters the ATAPI_Q7 state.

In the ATAPI_Q7 state, block 326 waits for the receipt of the seventh data quadlet. When the seventh data quadlet is received, control passes to block 328 in which the signal snoop_task_file9_en, snoop_task_file10_en, snoop_task_file11_en, and snoop_task_file12_en are all set equal to 1. The data in usb_rcv_data(31:24) of the seventh quadlet will load into task_file12, the data in usb_rcv_data (23:16) of the seventh quadlet will load into task_file11. The data in usb_rcv_data(15:8) of the seventh quadlet will load into task_file10 and the data in usb_rcv_data(7:0) of the seventh quadlet will load into task_file9. After the seventh quadlet is received, a state machine goes to the ATAPI_Q8 state.

In the ATAPI_Q 8 state, block 330 awaits the receipt of the eighth data quadlet. When the eighth data quadlet is received, control passes to block 332 in which the signal snoop_task_file13_en, snoop_task_file14_en, snoop_task_file15_en are set equal to 1 and signal cbw_valid is set equal to 1 if the CBW byte count is equal to 31. This will enable usb_rcv_data(23:16) of the eighth quadlet to load into task_file15, the data in usb_rcv_data (15:8) of the eight quadlet to load into task_file14. It will also enable usb_rcv_data(7:0) of the eighth quadlet to load into task_file13. When cbw_valid is set to 1 and the data packet has no CRC error, a USB data payload handling state machine would generate a cbw_valid interrupt to the microcontroller, so that microcontroller will initialize the ATAPI command phase. After the eighth data quadlet is received, the state machine proceeds to the state WAIT_EOT.

Returning now to the CHK_OP_CODE state at block 334, if the opcode of the CBW which is found in usb_rcv_data (31:24) of the fourth quadlet does not match the read (10) opcode of 28h, or the write (10) opcode of 2Ah, then the machine goes to the WAIT_EOT. If it does match, the state machine goes to the state ATA_Q5.

At the state ATA_Q5, block 336 awaits the receipt of the fifth data quadlet. If the 48 bit LBA (logic block address) is implemented, then the signal Iba48_en will be equal to 1 to show that this feature is enabled. In this case then the signals snoop_task_file_11_en, snoop_task_file_10_en and snoop_task_file_9_en will all be set equal to 1 to show that this feature is enabled. In addition, the signals snoop_task_file_6_en, snoop_task_file_5_en and snoop_task_file_4_en will all be set equal to 1. If a LBA address error is detected, the state machine will go to the state WAIT_EOT, otherwise the state machine will go to the state ATA_Q6.

The state ATA_Q6 looks for the receipt of the sixth quadlet at block 342. Once this quadlet has been received, control passes to block 344. In block 344 if the 48 bit addressing is enabled, the signal snooptask_file_8_en will be set equal to 1 to show that this feature is enabled. In addition, the signal snoop_task_file_3_en, snoop_task_file_2_en, snoop_task file_1_en and snoop_task_file_0_en will all be set equal to 1. If a sector count error occurs, the state machine will go to the WAIT_EOT state, otherwise it will proceed to state ATA_Q7.

Before proceeding with the operation of the state machine, we will discuss the utilization of LBA 28 bit and 48 bit addressing modes for ATA hard drives. The 28 bit addressing mode is the older addressing mode which is useful for smaller hard drives. However, today's larger hard drives require more address bits. These newer drives use a LBA 48 bit addressing mode. The registers described above are 1 byte wide registers. For 48-bit LBA addressing, the ATA interface utilizes 2 byte wide registers. Accordingly, it is necessary to perform two write operations in order to load the necessary registers for the ATA interface. This is depicted in Table 2 below:

TABLE 2

| ATA Register Name | Second Write | First Write |
|---|---|---|
| Sector count | Sector count (7:0) | Sector count (15:8) |
| Sector Number | LBA (7:0) | LBA (31:24) |
| Cylinder Low | LBA (15:8) | LBA (39:32) = 00 h |
| Cylinder High | LBA (23:16) | LBA (47:40) = 00 h |
| Device/Head reg. | Snoop_ata_task_file6 | |

When utilizing the LBA 28 bit addressing scheme, the task_file2 contains the sector count (7:0) with the data coming from usb_rcv_data(31:24) of the sixth quadlet. If the transfer length (15:0) from the read (10) or write (10) command is larger than 256 or equal to 0, this constitutes a sector count error and the state machine will ignore the data packet. The task_file3 contains the LBA (7:0) with the data coming from usb_rcv_data(7:0) of the sixth quadlet. The task_file4 contains the LBA (15:8) with the data coming from usb_rcv_data(31:24) of the fifth quadlet. The task_file 5 contains the LBA (23:16) with the data coming from usb_rcv_data(23:16) of the fifth quadlet. The task_file6 contains ("010" & dev_sel & LBA(27:24)) where "010" means the LBA address mode, dev_sel=0 selects device 0 and dev_sel=1 selects device 1. LBA (27:24) comes from usb_rcv_data (11:8) of the fifth quadlet. If usb_rcv_data (15:12) of the fifth quadlet is not equal to 0, this is a LBA address error. Read (10) and write (10) will provide a 32 bit logic block address, but the upper 4 bit address should be 0, because the LBA 28 bit addressing scheme only uses the lower 28 bits of the 32 bit LBA address. If the upper 4 bit address is non-0, this is a LBA address error. The task_file7 contains the read DMA (C8h) translated from read (10) or write DMA (CAh) translated from write (10). The file task_file2 to task_file7 value will be written to the ATA device to send an ATA command.

In the LBA 48 bit addressing scheme, task_file2 contains sector count (7:0) with the data coming from usb_rcv_data (31:24) of the sixth quadlet. The task_file8 contains the sector count (15:8) with the data coming from usb_rcv_data (23:16) of the sixth quadlet. The sector count (15:0) is the total sector count to be transferred. An ATA state machine will write to an ATA sector count register with a task_file8 value to deliver the sector count (15:8). Then, as stated earlier, it is necessary to have a second write to provide the 2 byte wide interface. The ATA state machine will write to the ATA sector count register again with a task_file2 value to deliver the sector count (7:0). If the transfer length (15:0) from read (10) or write (10) command is equal to 0, which means the sector count (15:0) is equal to 0, this is a sector count error and the state machine will ignore the data packet.

The task_file3 contains the LBA (7:0) with the data coming from the usb_rcv_data (7:0) of quadlet six. The task_file9 contains LBA (31:24) with the data coming from usb_rcv_data (15:8) of the fifth quadlet. The ATA state machine will write to the ATA sector number register with the task_file9 value to deliver LBA (31:24), and then the ATA state machine will write to the ATA sector number register again with the task_file3 value to deliver LBA (7:0). The task_file4 contains LBA (15:8) with the data coming from usb_rcv_data (31:24) of the fifth quadlet. The task_file10 contains LBA (39:32) but the logical block address from the read (10) and write (10) command will only have a 32 bit address. Therefore, task_file10 has a value of 00h. The ATA state machine will write to the ATA cylinder low register with the value in task_file10 to deliver LBA (39:32), then the ATA state machine will write again to the ATA cylinder low register with the value in task_file4 to deliver LBA (15:8).

The task_file5 contains LBA (23:16) with the data coming from usb_rcv_data (23:16) of the fifth quadlet. The task_file11 contains LBA (47:32), but the logical block address (LBA) from the read (10) and write (10) command only had a 32 bit address, so that task_file11 should have a value which is 00h. The ATA state machine will write to the ATA cylinder high register with the value task_file11 to deliver LBA (47:40), then the ATA state machine will write to the ATA cylinder high register again with the value task_file5 to deliver LBA (23:16). The task_file6 contains ("010" & dev_sel & "0000") where "010" means the LBA address mode, dev_sel is 0 to select the device 0 and is 1 to select device 1. The task_file7 contains the read DMA Ext. (25h) translated from read (10) or write DMA Ext. (35h) translated from write (10). The task_file2 to task_file7 values will write to the ATA device to send an ATA command.

The ATA_Q7 state waits for the seventh quadlet at block 348. When the seventh quadlet is received, the state machine goes to the state ATA_Q8.

In the state ATA_Q8, the machine waits for the receipt of the eighth quadlet at 350. When the eighth quadlet is received, control passes to block 352. In block 352, when the eighth quadlet is received, a check is made to see if the data packet byte count is equal to 31. If it is equal to 31, the cbw_valid signal is set equal to 1. When this signal is set equal to 1 and the data packet has no CRC error, the USB data payload handling state machine will generate a cbw_valid interrupt to the microcontroller, so the microcontroller can initialize the ATA command phase. The seventh and eighth quadlets contain the reserved data and they are ignored by the state machine. After the eighth quadlet is received, the state machine goes to the WAIT_EOT state. The WAIT_EOT state waits to the end of the transaction at block 354 and when the transactions end, it returns the state machine to the CBW_IDLE state and the process begins again.

Figure 4:
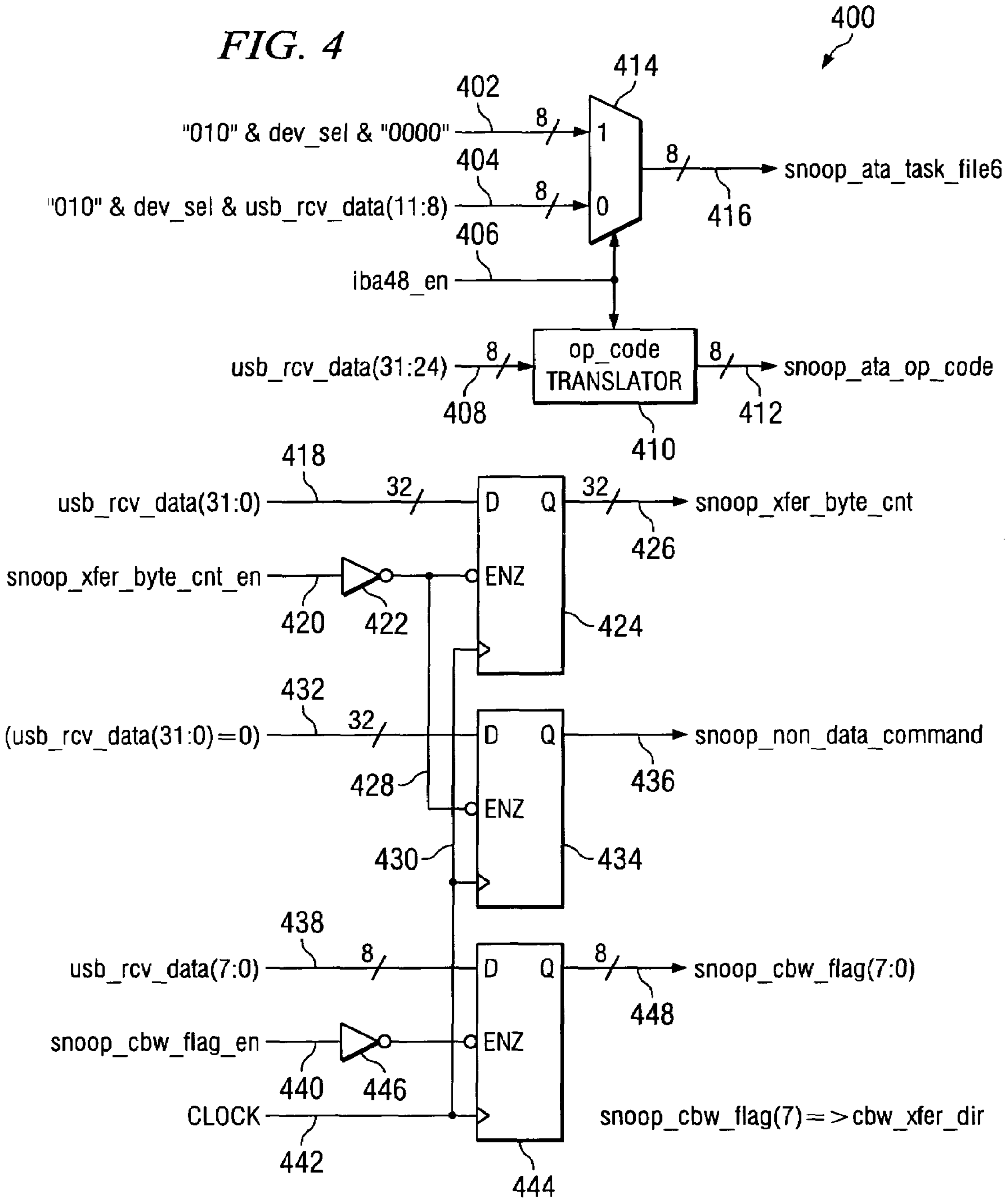
FIG. 4 is a circuit diagram of a portion of the parameter selection logic circuit for the state machine of FIG. 3.

Referring now the FIG. 4, parameter selection logic is shown generally as 400. A multiplexer 414 receives a signal "010" & dev_sel & "0000" which comes from the task_file6 as described above in connection with FIG. 3. Line 404 receives the signals "010" & dev_sel & usb_rcv_data (11:8) which also comes from task_file6 as described above in connection FIG. 3. The signal Iba48_en is a select signal used to operate multiplexer 414 to determine whether the signal on 402 or signal on 404 is selected. The signal on line 402 is for the 48 bit addressing scheme and the signal on line 404 is the 28 bit addressing scheme. The output of multiplexer on line 416 is the snoop_ATA_task_file6 which is sent to the "device head" register. An op_code translator 410 receives usb_rcv_data (31:24) from the task_file7 described above in connection with FIG. 3 and translates that into the snoop_ATA_op_code on line 412 which is a read or write code form the CBW.

The parameter logic also includes three data flip flops 424, 434 and 444, each having its clock input connected to the clock signal on line 442 via line 430. Flip flop 424 receives on input line 418 the signal usb_rcv_data (31:0) which is the transfer length of the data to be sent. The signal snoop_xfer_byte_cnt_en on line 420 is set equal to 1 in block 308 to enable the transfer length to be used to generate the signal snoop_xfer_byte_cnt on line 426. Flip flop 434 receives a signal 432 which is usb_rcv_data (31:0)=0 which tells the system that the transfer length is equal to 0 and therefore this is a non-data command. This generates a digital 1 for the signal snoop_non_data_command on line 436. Flip flop 444 receives a signal usb_rcv_data (7:0) on line 438 and the enable signal snoop_cbw_flag_en on line 440. This allows the bit flag, which is bit 7, to be extracted as the other bits are reserved, to generate the signal snoop_cbw_flag (7:0) on line 448.

Figure 5A:
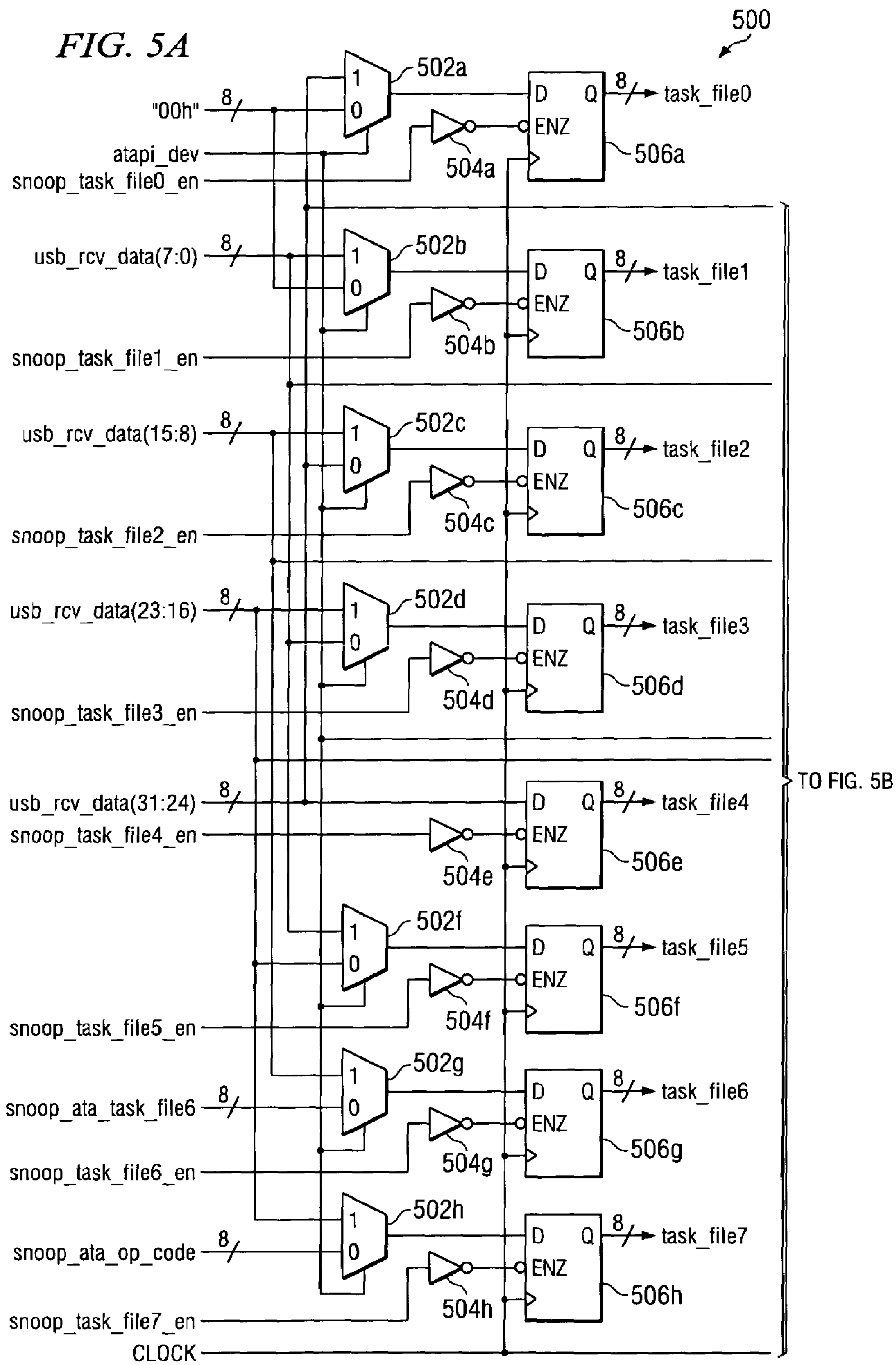
FIGS. 5A and 5B are circuit diagrams of the remainder of the parameter selection logic circuit for the state machine of FIG. 3.
Figure 5B:
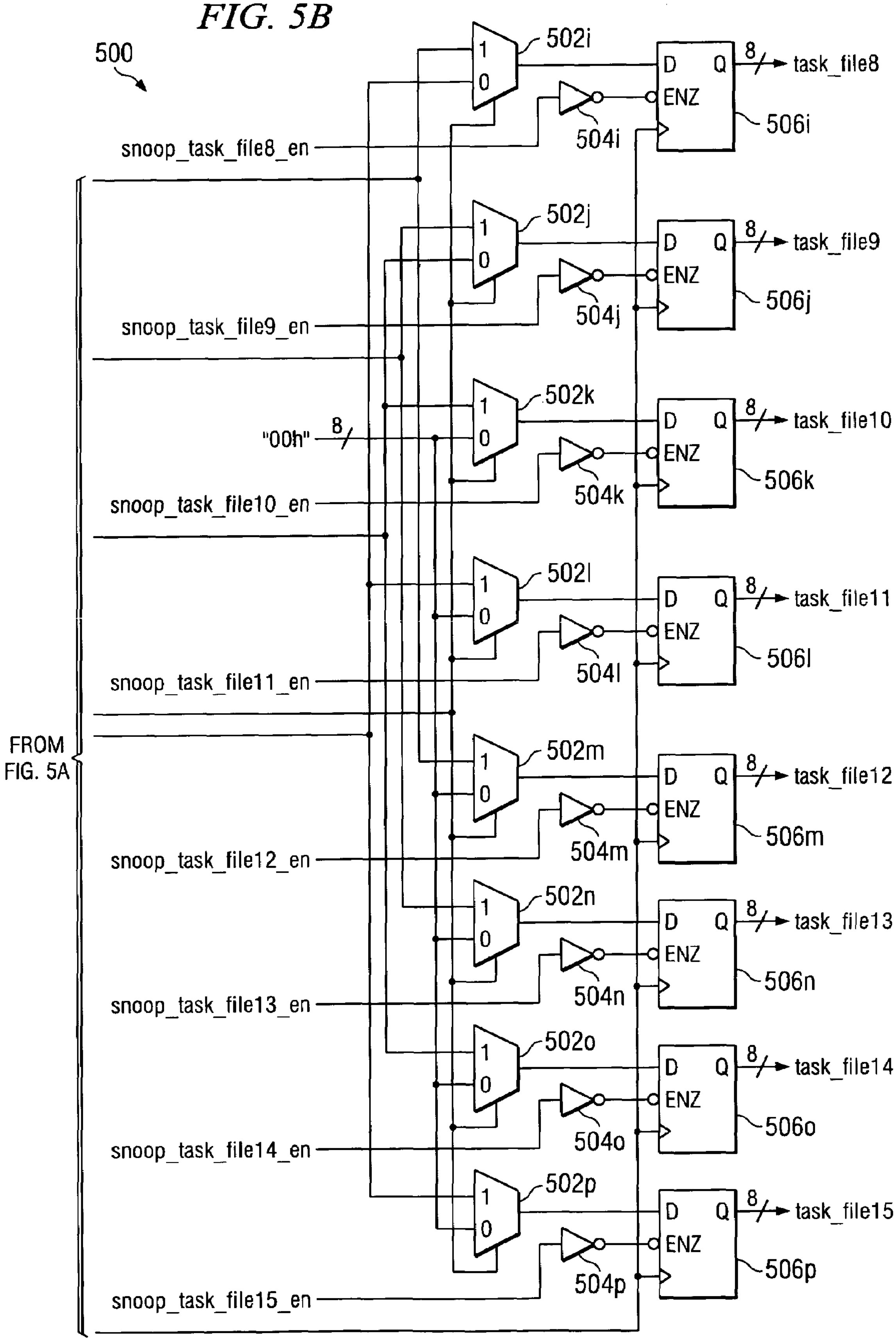

FIG. 5 shows a multiplexer circuit generally as 500 which is utilized to load the sixteen registers necessary to perform the transaction. Each of the multiplexer stages a through p comprise a 2 bit multiplexer 502 having an output coupled to the D input of a flip flop 506. Each of the enable inputs ENZ, which are active low, are fed via an inverter 504. The "e" stage does not have a multiplexer 502 and the signal is fed directly into the D input of the flip flop 506 e. The select signal for all the multiplexers are coupled together and coupled to the signal atapi_dev which is the ATAPI select signal and is 1 for an ATAPI and a 0 for an ATA drive. The clock inputs for all of the flip flops 506 are coupled together to the system clock (clk). Many of the multiplexer inputs are connected to each other. The "1" inputs of the a, i and m stages and the "0" inputs of the k, l, m, n, o and p stages are connected together; as are the "1" inputs of the b, f, j and n stages and the "0" input of the d stage; the "1" inputs to the c, g, k and o stages and the "0" input of the j stage are connected together; and the "1" inputs to the d, h, l and p stages and the "0" inputs to the f and i stages are connected together. The "0" input to multiplexer of 502*a* is connected to "00h" . The "1" input to 502*b* is connected to usb_rcv_data (7:0). The "1" input to 502*c* is coupled to usb_rcv_data ( 15:8). The "1" input to 502*d* is coupled to usb_rcv_data (23:16). The e stage has the signal usb_rcv_data (31:24) directly coupled to the D input to the flip flop 506*e*. The "0" input to 502*g* is connected to snoop_ata_task_file6. The "0" input to 502*h* is coupled to snoop_ata_op_code. The "0" input to 502*k* is connected to "00h". All of the other inputs are connected to one of the inputs already described. The enable inputs are labeled "snoop task_filex_en", where x is 0-15 to load the 16 registers task_files 0-15 with the required data. The generation of the enable signals and the data that will be extracted is described above in connection with FIG. 3.

Figure 6:
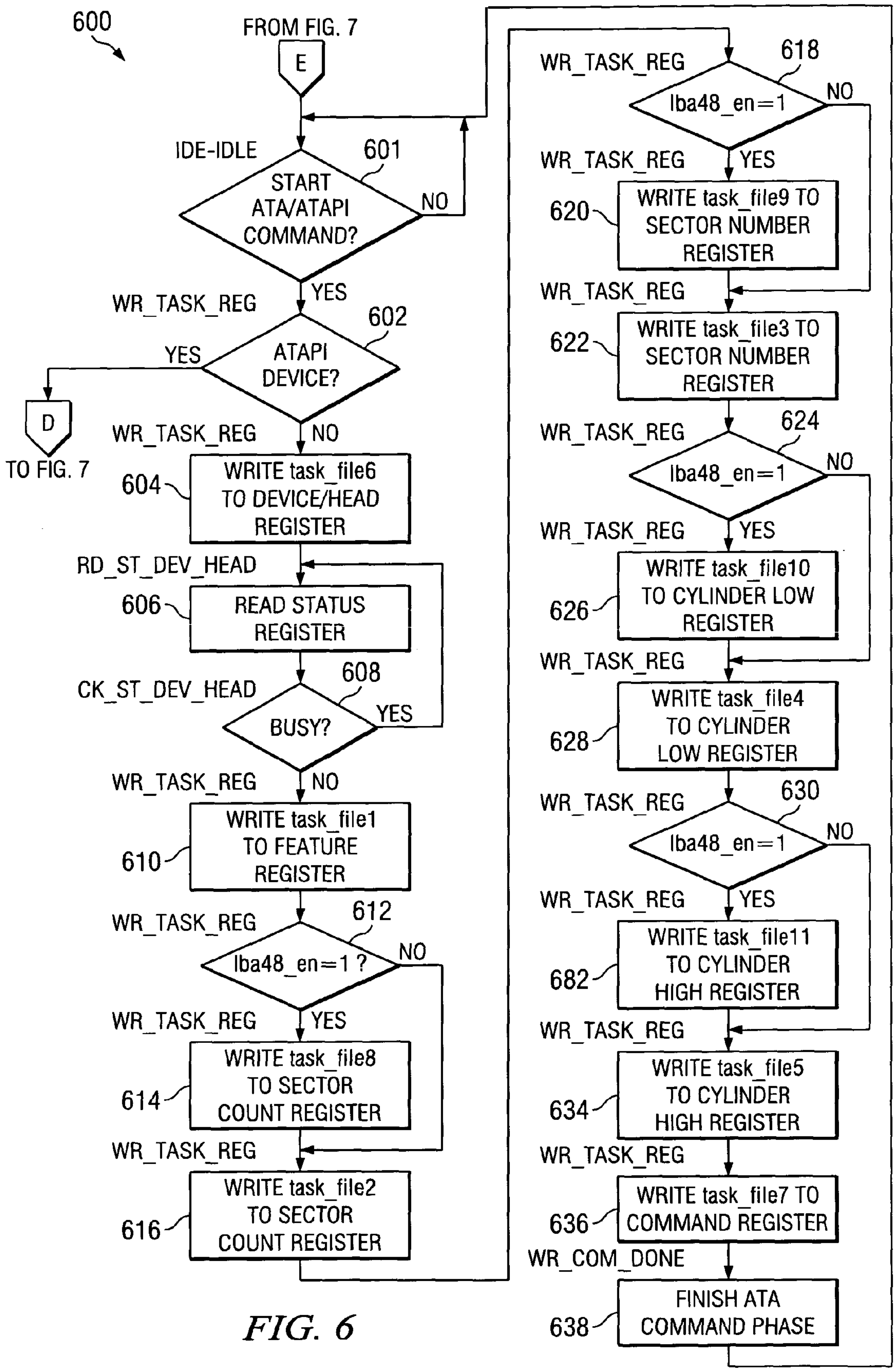
FIGS. 6 and 7 are state machine diagrams for computer program of the software controlled microcontroller.
Figure 7:
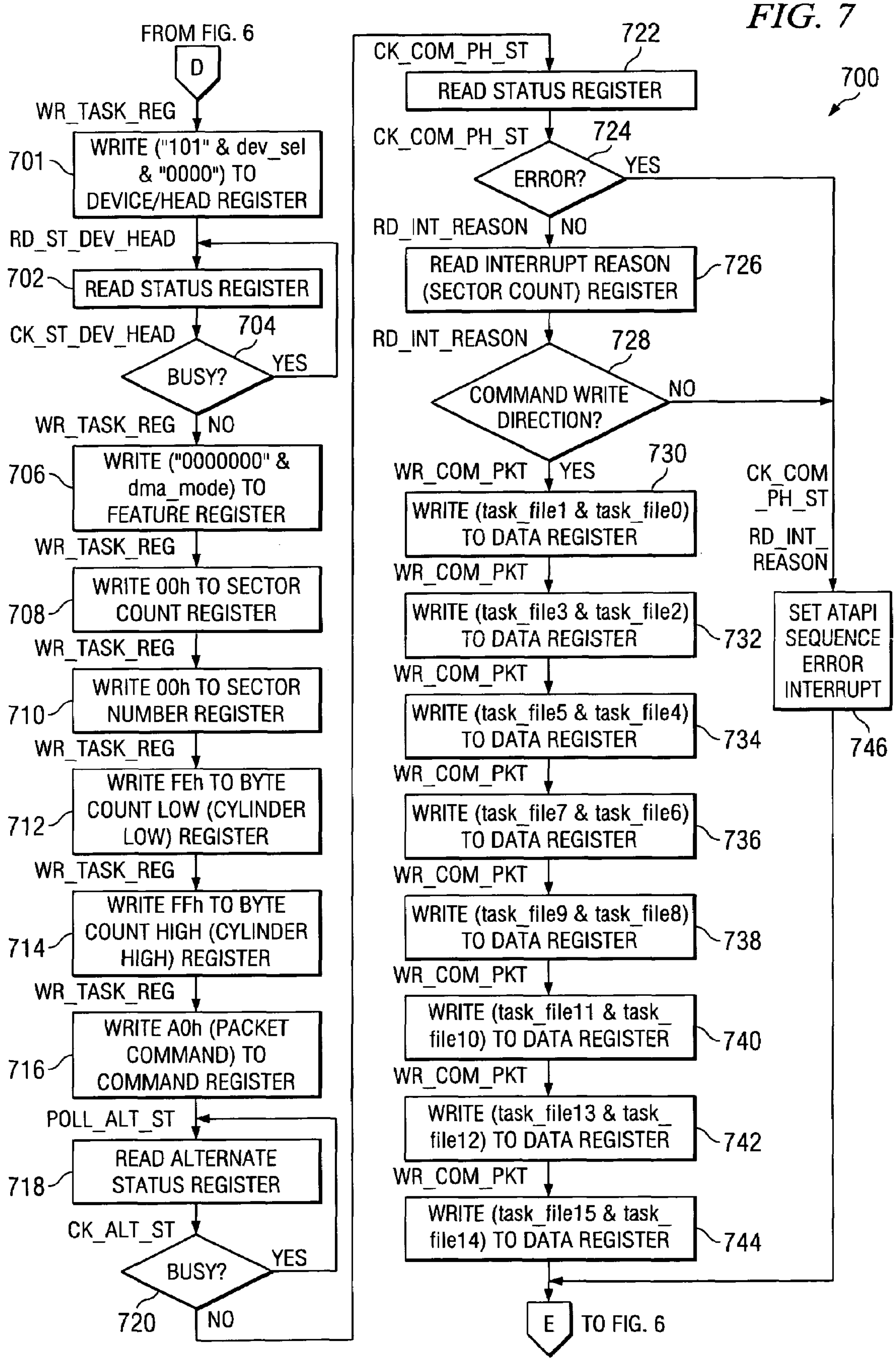

FIGS. 6 and 7 show an ATA/ATAPI command state machine which is used to send ATA or ATAPI commands to the ATA or ATAPI devices. FIG. 6 shows the first portion of the machine generally as 600 and FIG. 7 shows the second portion of the state machine generally as 700. The Figures are connected to each other by connection points E and F. The ATA/ATAPI command state machine utilizes the information in task_file0 to task_file15 as the command parameters. If the dev_sel is equal to 0, the command will select device 0 and if the dev_sel is equal to 1, the command will select device 1. If the signal Iba48_en is equal to 1, a 48 bit LBA address is used to address the ATA hard drive. However, sixteen bits of the 48 bit address are filled with 0's because the CBW command only contains a 32 bit address. If the signal 1ba48_en is equal to 0, a 28 bit LBA address is used to address the ATA hard drive. If the dma_mode signal is equal to 1, a DMA data transfer will be used for the transfer phase. The determination of whether Multiword DMA or Ultra DMA would be utilized is determined during the device configuration.

After the state machine shown in FIG. 3 detects a valid CBW packet, it will generate a signal cbw_valid to interrupt the microcontroller. After the microcontroller receives a cbw_valid interrupt, it will start the ATA/ATAPI command state machine to send the command to the ATA or ATAPI device. If the state machine detects an invalid CBW packet, the cbw_valid interrupt is not generated. In this case, the microcontroller will modify the task_file0 to task_file15 information before starting the ATA/ATAPI state machine when the CBW packet is not decoded by the state machine shown in FIG. 3 for an ATA device.

The state machine shown in FIG. 6 generally as 600 starts at the IDE_IDLE state 601 which is the idle state waiting for a microprocessor to start the ATA/ATAPI state machine. Control then passes to block 602 labeled WR_TASK_REG, which decides if the device is an ATAPI device or not. If it is, control passes to point A and to FIG. 7, discussed below. If it is an ATA device, control passes to block 604 labeled WR_TASK_REG in which the task_file6 value is written to the device/head register. If the signal Iba48_en equals 1, the task_file6 information contains ("010" & dev_sel & "0000"). The "1" in the "010" means the LBA address mode. If Iba48_en equals 0, the task_file6 contains ("010" & dev_sel & LBA (27:24)). The value LBA (27:24) is stored in the task_file6 register with the value of usb_rcv_data (11:8) coming from the fifth quadlet of the CBW packet. Control passes to block 606 which reads the status register and passes control to block 608. Block 608 determines whether the status register is busy. If it is busy, control passes back to block 606 until the status register is not busy. Once the status register is not busy, control passes to block 610. In block 610, the task_file1 value is written to the feature register. The feature register is reserved and is not used for an ATA device command. Control then passes to block 612. In block 612, the value of Iba48_en is checked to see if it equals 1. If it equals 1, control passes to block 614 in which the task_file8 value is written to the sector count register. The task_file8 contains the sector count (15:8) for a 48 bit LBA address. Control passes to block 616. If the test in block 612 on the value of Iba48_en being equal to 1 fails, control passes directly to block 616. In block 616 the value in task_file2 it is written to the sector count register. The task_file2 contain the sector count (7:0). 48 bit LBA utilizes 16 bits for the sector count and 28 LBA addressing utilizes 8 bits for the sector count.

Control then passes to block 618. In block 618, the signal Iba48_en is again tested to see if it equals 1. If it does control passes to block 620. In block 620 the value task_file9 is written to the sector number register. The task_file9 contains LBA (31:24). Control then passes to block 622. If the test in block 618 fails, control passes directly to block 622. In bloc 622 the value of the task_file3 is written sector number register. The task_file3 contains LBA (7:0). Control then passes to block 624. If the value Iba48_en is equal 1, control passes to block 626. In block 626 the value task_file10 written to the cylinder low register. Task_file10 contains LBA (39:32). Since the CBW packet provides only a 32 bit LBA address, the value of task_file10 will be 0. Control passes to block 628. If the test in block 624 fails, control passes directly to block 628. In block 628, the value of task_file4 is written to the cylinder low register. The task_file4 contains LBA (15:8). Control passes to block 630. If lba48_en is equal to 1, control passes to block 632. In block 632 the value task_file11 is written to the cylinder high register. Task_file11 contains LBA (47:40). Because CBW packet only provides a 32 bit LBA address, the value of task_file11 is 0. Control passes to block 634. If the test of block 630 fails, control passes directly to block 634.

In block 634, the value of task_file5 is written to the cylinder high register. The task_file5 contains LBA (23:16). Control then passes to block 636. In block 636 the value of task_file7 is written to the command register. Task_file7 contains the command code for the ATA device. Control then passes to block 638. In block 638 the process is completed by writing the ATA command to the ATA device and then returning back to the idle state to wait for the next command phase.

Turning now to FIG. 7, the second portion of the command state machine is shown generally as 700. The command state machine starts with the terminal A which is where the state machine shown in FIG. 6 branches on the determination of whether or not the device is an ATAPI device. If the device is an ATAPI device, the state machine jumps to the state machine's portion shown in FIG. 7. Control passes to block 701 in which ("010" & dev_sel & "0000" is written to the device/head register to select either device 0 or device 1 of the attached ATAPI devices. Control passes to block 702. In block 702, the status register is read. Control passes to block 704 in which a determination is made as to whether the status register is busy. If it is, control returns back to block 702 until the status register is not busy. Once the status register is not busy, control passes to block 706. At block 706 the value ("0000000" & dma_mode) is written to the feature register. If dma_mode is 1, the data transfer is via Multiword DMA (direct memory access) or Ultra DMA mode. If dma_mode is 0, data transfer is via PIO (programmed input/output) mode. Control passes to block 708. In block 708, 00h is written to the sector count register. Control passes to block 710. In block 710 00h is written to the sector number register. Control passes to block 712. In block 712, FEh is written to the byte count low (cylinder low) register. Control passes to block 714. In block 714, FFh is written to the byte count high (cylinder high) register. The byte count limit has a maximum value of FFFEh. Control passes to block 716. In block 716 A0h, which is the packet command code, is written to the command register. Control passes to block 718. In block 718 the alternate status register is read to make sure the device is not busy before the read status register is read. Control passes to block 720. In block 720, if the alternate status register is busy, control returns back to block 718 until the alternate status register is not busy. Once the alternate status is not busy, control passes to block 722. In block 722, the status register is read. Control passes to block 724. In block 724 if the error bit is set to 1, control passes to block 746 in which the ATAPI sequence error interrupt is set and control passes to terminal B, which returns to FIG. 6, and returns the state machine to IDE_IDLE state 601. Otherwise, control passes to block 726. In block 726, the interrupt reason (sector count) register is read. If the interrupt reason register value does not indicate a command write direction, control will pass to block 746 in which the ATAPI sequence error is set and the state machine returns to the idle state. If the interrupt reason register value indicates a command write direction, control passes to block 730. In block 730, the command packet containing task_file1 and then task_file0 are written to the data register. Control then passes to block 732.

In block 732 the task_file3 and task_file2 are written to the data register. Control passes to block 734. In block 734, the task_file5 and task_file4 are written to the data register. Control passes to block 736. In block 736, the task_file7 and task_file6 are written to the data register. Control passes to block 738. In block 738, the task_file9 and task_file8 are written to the data register. Control passes to block 740. In block 740, the task_file11 and task_file10 are written to the data register. Control passes to block 742. In block 742, the task_file13 and task_file12 are written to the data register. Control passes to block 744. In block 744, the task_file15 and task_file14 are written to the data register. After this is completed, control passes to terminal B, back to FIG. 6, and back to the idle state IDE_IDLE.

In the present invention, as described above, the data is processed by a hardware state machine while it is being transferred to the input buffer which enables the set up of the data transfer to take place in less than 10 microseconds. In the event that the targeted drive is a non-standard device, the microcontroller can make the necessary changes in the values stored in the drive registers to allow the data transfer to take place even though the device is a non-standard device. Although this will take additional time, normally the changes that are necessary involve one or two registers, so that most of the time savings achieved by the hardware state machine are preserved. The time required to make a change to a single register, for example, might increase the processing time to 70–80 microseconds. Although this is slower than the result would be if processed solely by a hardware state machine, either solution is a vast improvement over the 500–700 microseconds of the controllers of the prior art. Thus, the present invention maintains the speed advantages of the hardware state machine with the processing advantages of the software state machine and does so at a much higher speed than available heretofore.

While the invention has been shown and described with reference to preferred embodiments thereof, it is well understood by those skilled in the art that various changes and modifications can be made in the invention without departing from the spirit and scope of the invention as defined by the appended claims. For example, although the invention has been illustrated for a USB bus, it can also be used with other serial bus link based systems, such as IEEE 1394 systems.

The invention claimed is:

1. A bridge controller for transferring data between a data storage device and a data utilization device, the bridge controller receiving a command information packet for controlling the data transfer, comprising:

a state machine receiving command information in a background mode in real time as the packet is being transferred to the bridge controller, the state machine utilizing the command information to set up the receiving device for the data transfer; and a programmable processor coupled to the command information packet after the packet has been received, the processor making changes to the set up of the receiving device for the transfer, if needed, and then initiating the data transfer.

2. The bridge controller of claim 1 wherein the command information packet is received serially from the data utilization device.

3. The bridge controller of claim 1 wherein the command information packet is stored in a buffer memory in the bridge controller.

4. The bridge controller of claim 3 wherein the information of the command information packet is processed in real time by the state machine as it is being stored in the buffer memory.

5. The bridge controller of claim 4 wherein the buffer memory is a first in first out (FIFO) buffer memory.

6. The bridge controller of claim 4 wherein the processor is interrupted once the buffer memory is full.

7. The bridge controller of claim 1 wherein the data utilization device is a computer and the data storage device is an ATA or ATAPI device.

8. The bridge controller of claim 7 wherein the link between a bridge and the computer is by a Universal Serial Bus (USB) link.

9. The bridge controller of claim 7 wherein the data storage device is a device selected from the group consisting of an ATA hard drive, an ATAPI CD drive or an ATAPI DVD drive, Compact Flash Card, or MO drive.

10. The bridge controller of claim 1 wherein the state machine is formed in an ASIC.

11. A USB to ATA/ATAPI bridge comprising:

a physical layer receiving serial command data from the USB bus and converting the data to a parallel format;

a transfer controller receiving the parallel data for transferring the data to a buffer memory;

a state machine operating in background mode on the parallel data flowing through the transfer controller in real time to set up the ATA or ATAPI device for a data transfer; and a programmable processor coupled to the buffer memory and being interrupted after all command information has been received, to individually alter any set up data for the ATA or ATAPI device that is needed, and then initiating the data transfer.

12. The bridge of claim 11 wherein the serial data is on a USB 2.0 bus.

13. The bridge of claim 12 wherein the serial data is from a USB host in a computer.

14. The bridge of claim 11 wherein the command data is in the form of a command block wrapper (CBW).

15. The bridge of claim 11 wherein the ATA device is an ATA hard drive and the ATAPI device is an ATAPI CD drive or an ATAPI DVD drive.

16. The bridge of claim 11 further comprising a plurality of task registers in the bridge receiving command data, the registers containing data needed by the ATA or ATAPI device to set up a data transfer.

17. The bridge of claim 16 wherein the processor transfers data in the plurality of registers to the ATA or ATAPI device to prepare for data transfer.

18. The bridge of claim 11 wherein the state machine is formed in an ASIC.

19. A method of operating a USB to ATA or ATAPI bridge comprising:

transferring command data from a data utilization device via a USB bus through a data transfer device to a buffer memory;

operating a state machine in a background mode using data flowing through the data transfer device in real time to extract set up data and store the data to set up a data transfer;

operating a programmable processor utilizing the data stored in the buffer memory to individually alter the command-related data for the ATA or ATAPI device that is needed; and initiating the data transfer.

20. The method of claim 19 wherein the command data is a command block wrapper (CBW) for a USB 2.0 mass storage class protocol, the set up data is transferred to a plurality of registers in the bridge and is then transferred to the ATA or ATAPI device before the data transfer commences.

* * * * *